(12) United States Patent
Choi et al.

(10) Patent No.: US 11,273,883 B2
(45) Date of Patent: Mar. 15, 2022

(54) TILTING STRUCTURE OF MOBILITY DEVICE AND MOBILITY DEVICE INCLUDING SAME

(71) Applicants: Hyundai Motor Company, Seoul (KR); Kia Motors Corporation, Seoul (KR)

(72) Inventors: Jung Nam Choi, Seongnam-si (KR); Sung Dae Lim, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 391 days.

(21) Appl. No.: 16/661,940

(22) Filed: Oct. 23, 2019

(65) Prior Publication Data

US 2020/0346707 A1   Nov. 5, 2020

(30) Foreign Application Priority Data

May 2, 2019   (KR) ..................... 10-2019-0051577

(51) Int. Cl.
  *B62K 5/10*  (2013.01)
  *B62K 5/08*  (2006.01)
  *B62K 5/01*  (2013.01)
(52) U.S. Cl.
  CPC .................. *B62K 5/10* (2013.01); *B62K 5/08* (2013.01); *B62K 5/01* (2013.01)
(58) Field of Classification Search
  CPC ... B62K 5/10; B62K 5/08; B62K 5/01; B62D 9/02; B62D 9/04; B62D 7/00; F16H 1/06; F16H 1/14

USPC .............. 280/124.103, 93.513, 93.502, 267; 74/487, 489
See application file for complete search history.

(56) References Cited

U.S. PATENT DOCUMENTS

| | | | | |
|---|---|---|---|---|
| 2,231,338 A | * | 2/1941 | Kolbe ..................... | B62D 3/04 280/124.103 |
| 3,746,118 A | * | 7/1973 | Altorfer ................. | B62K 21/00 180/210 |
| 3,958,814 A | * | 5/1976 | Smith ...................... | B62K 5/05 280/269 |
| 4,087,106 A | * | 5/1978 | Winchell ................ | B62B 13/12 180/183 |
| 4,087,107 A | * | 5/1978 | Winchell ................ | B62K 5/10 280/220 |

(Continued)

*Primary Examiner* — Minnah L Sech
*Assistant Examiner* — Carena Mary Toy
(74) *Attorney, Agent, or Firm* — Morgan, Lewis & Bockius LLP

(57) ABSTRACT

A tilting structure of a mobility device and the mobility device including same, may include a base frame; front wheel frames mounted on opposite front sides of the base frame and coupled to the base frame through front wheel shift gear portions extending in vertical directions; a tilting bar coupled to the base frame to be tiltable transversely with respect to a tilting center, with a first side of the tilting bar being branched and extending to opposite sides; and front wheel rotation gears engaged to opposite end portions of the tilting bar, respectively, to be rotated in the same direction that tilting bar is tilted, and engaged with the front wheel shift gear portions and rotated and thus moving the front wheel shift gear portions relative to each other in the vertical directions with respect to the base frame.

15 Claims, 10 Drawing Sheets

(56) References Cited

U.S. PATENT DOCUMENTS

| | | | | |
|---|---|---|---|---|
| 4,385,770 | A * | 5/1983 | Mitchell | B62K 5/10 280/203 |
| 4,423,795 | A * | 1/1984 | Winchell | B60G 21/007 180/215 |
| 4,469,344 | A * | 9/1984 | Coil | B62K 5/05 280/269 |
| 5,611,555 | A * | 3/1997 | Vidal | B60G 3/14 180/215 |
| 6,341,790 | B1 * | 1/2002 | Chen | A63C 17/01 280/267 |
| 7,487,985 | B1 * | 2/2009 | Mighell | B62K 5/027 180/210 |
| 2012/0258840 | A1 * | 10/2012 | Eisenberg | A63B 23/03575 482/57 |
| 2018/0022411 | A1 * | 1/2018 | Kistemaker | B62J 17/04 180/208 |
| 2019/0016405 | A1 * | 1/2019 | Huang | B62K 5/05 |
| 2019/0105959 | A1 * | 4/2019 | Knisley | B62K 5/10 |

* cited by examiner

NORMAL POSITION

GENERATING DIFFERENTIAL
DISPLACEMENT BETWEEN FRONT WHEELS

ACTUAL TILTING OF FRONT WHEELS

TILTING STRUCTURE OF MOBILITY DEVICE AND MOBILITY DEVICE INCLUDING SAME

CROSS REFERENCE TO RELATED APPLICATION

The present application claims priority to Korean Patent Application No. 10-2019-0051577, filed May 2, 2019, the entire contents of which is incorporated herein for all purposes by this reference.

BACKGROUND OF THE INVENTION

Field of the Invention

The present invention relates to a tilting structure of a mobility device and a mobility device including the tilting structure and, more particularly, to a structure capable of realizing the tilting of a personal mobility device during turning.

Description of Related Art

Recently, individual personal mobility devices have become very popular, and interest in small three-wheeled or four-wheeled vehicles and bikes is increasing. A mobility device has been launched in various forms and are operated using a driving method in which a passenger directly steps on a pedal, and a driving method using fossil fuel energy or electrical energy.

Such a mobility device is light in weight and has a high center of gravity, so roll-over of the mobility device is easily caused during turning. Therefore, to improve driving stability, a structure configured for steering wheels and tilting the wheels has been required.

In the case of a vehicle, a device that operates a separate actuator to tilt the wheels during turning is mounted in the vehicle. However, the device increases weight and cost of the personal mobility device due to complicated structure thereof, so there has been a problem that it is difficult to apply the device to the personal mobility device.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a structure realizing tilting of a mobility device through a simple structure without an actuator.

In various aspects of the present invention, there is provided a tilting structure of a mobility device, the tilting structure includes: a base frame; front wheel frames mounted on opposite front sides of the base frame and coupled to the base frame through front wheel shift gear portions extending in vertical directions; a tilting bar coupled to the base frame to be tiltable transversely with respect to a tilting center positioned a portion of the tilting bar, with a first side of the tilting bar being branched and extending to opposite sides; and front wheel rotation gears engaged to first and second opposite end portions branched from the first side of the tilting bar, respectively, to be rotated in the same direction that the tilting bar is tilted, and engaged with the front wheel shift gear portions and rotated and thus moving the front wheel shift gear portions relative to each other in the vertical directions with respect to the base frame.

A connection link extending upward from the base frame may be fixed to the base frame, and have a shape extending in a longitudinal direction of the base frame to form the tilting center at which the tilting bar is tilted, and the tilting bar may be coupled to the connection link to be tiltable to the opposite sides.

Each of the front wheel rotation gears may extend in a longitudinal direction of the base frame, and be coupled to the base frame to be rotatable on an axis of the extending direction thereof.

The opposite end portions branched from the first side of the tilting bar may be provided with tilting gears engaged with the front wheel rotation gears, respectively, and the front wheel rotation gears may be rotated by movement of the tilting gears while the tilting bar is tilted.

The tilting gears may be mounted on the opposite end portions branched from the first side of the tilting bar and extend in a circumferential direction of the tilting bar tilted with respect to the tilting center.

A second side of the tilting bar may extend upward and be bent backward.

The tilting structure may further include: a steering bar extending from an upper portion of the tilting center in a longitudinal axis of the tilting bar, and connected to front wheels to rotate the front wheels sideways as the steering bar is rotated on an axis of the extending direction thereof, and the steering bar may be coupled to the tilting bar to be rotatable relative to the tilting bar on the axis of the extending direction thereof.

The tilting bar may be configured as a hollow shaft having a space therein, and the steering bar may be connected to the tilting bar to be rotatable relative to the tilting bar by being inserted in the space.

The steering bar may have a coupling pin protruding from an external surface of the steering bar and extending to an outside by passing through the tilting bar, and the tilting bar may have a through hole through which the coupling pin passes, the through hole extending along a moving path of the coupling pin depending on relative rotation of the steering bar.

The tilting structure may further include: steering shafts extending in the vertical directions, spaced in a longitudinal direction of the base frame apart from the front wheel frames to which axles of the front wheels are coupled, and turning the front wheel frames transversely as the steering shafts may be moved transversely; and steering connection links extending from the coupling pin to opposite sides and coupled to the steering shafts respectively, and being moved transversely by a rotation of the steering bar.

A steering handle may be provided on an upper end portion of the steering bar to extend in a planar direction perpendicular to the longitudinal direction of the steering bar.

The tilting structure may further include: rear wheel frames mounted on opposite rear sides of the base frame, and coupled to the base frame through rear wheel shift gear portions extending in vertical directions; and rear wheel rotation gears engaged with the rear wheel shift gear portions and rotated and thus moving the rear wheel shift gear portions relative to each other in the vertical directions with respect to the base frame.

The rear wheel rotation gears respectively provided on the opposite rear wheel frames may be connected to each other to be rotated in conjunction with each other.

The rear wheel rotation gears may extend in a longitudinal direction of the base frame, be coupled to the base frame to be rotatable on axes of the extending directions thereof, and have first bevel gears, respectively, at front end portions or rear end portions thereof, and the tilting structure may further include: second bevel gears having axles perpendicularly engaged with axles of the first bevel gears; and a bevel gear shaft connecting the opposite second bevel gears to each other so that the opposite second bevel gears may be rotated in conjunction with each other.

According to the tilting structure of the mobility device, intuitive tilting may be realized by only a simple structure without having the actuator.

The tilting may be controlled independently from steering of the mobility device.

The opposite front wheels are moved in opposite directions by the same distance, so that the opposite wheels may be tilted at the same angle.

The rear wheels have a structure configured for tilting with respect to the base frame, so that the rear wheels are tilted in conjunction with tilting of the front wheels, and the base frame may be prevented from being distorted.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
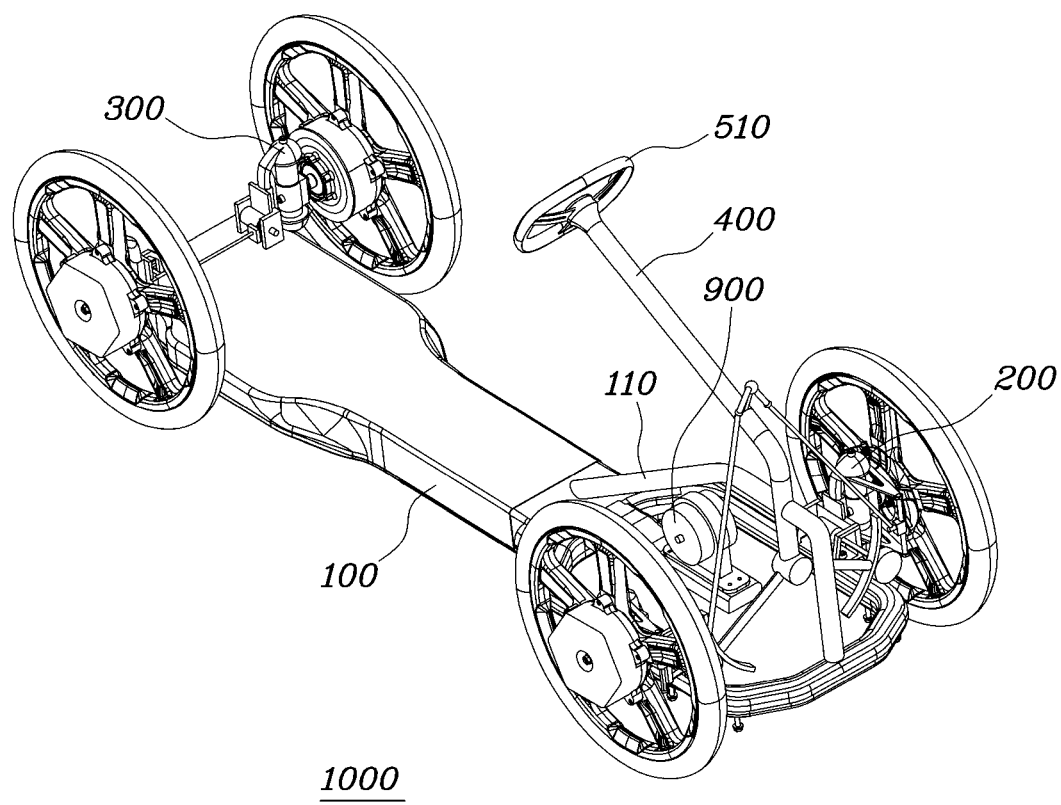
FIG. 1 is a perspective view showing a mobility device according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of an exemplary embodiment of the present invention included herein are only for illustrative purposes of the exemplary embodiment of the present invention. The present invention may be embodied in various forms without departing from the spirit and significant characteristics of the present invention. Therefore, the exemplary embodiment of the present invention is included only for illustrative purposes and may not be construed as limiting the present invention.

Reference will now be made in detail to the exemplary embodiment of the present invention, specific examples of which are illustrated in the accompanying drawings and described below, since the exemplary embodiment of the present invention may be variously modified in various forms. While the present invention will be described in conjunction with an exemplary embodiment thereof, it is to be understood that the present description is not intended to limit the present invention to the exemplary embodiment of the present invention. On the other hand, the present invention is directed to cover not only the exemplary embodiment of the present invention, but also various alternatives, modifications, equivalents and other embodiments which may be included within the spirit and scope of the present invention as defined by the appended claims.

It will be understood that, although the terms "first", "second", etc. may be used herein to describe various elements, these elements may not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it may be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing various exemplary embodiments only and is not intended to be limiting. As used herein, the singular forms "a", "an", and "the" are intended to include the plural forms as well, unless the context clearly indicates otherwise. It will be further understood that the terms "comprise", "include", "have", etc. When used in the exemplary embodiment, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present invention, and will not be interpreted in an idealized or overly formal sense unless expressly so defined herein.

Hereinbelow, an exemplary embodiment of the present invention will be described in detail with reference to the accompanying drawings. Throughout the drawings, the same reference numerals will refer to the same or like parts.

Figure 2:
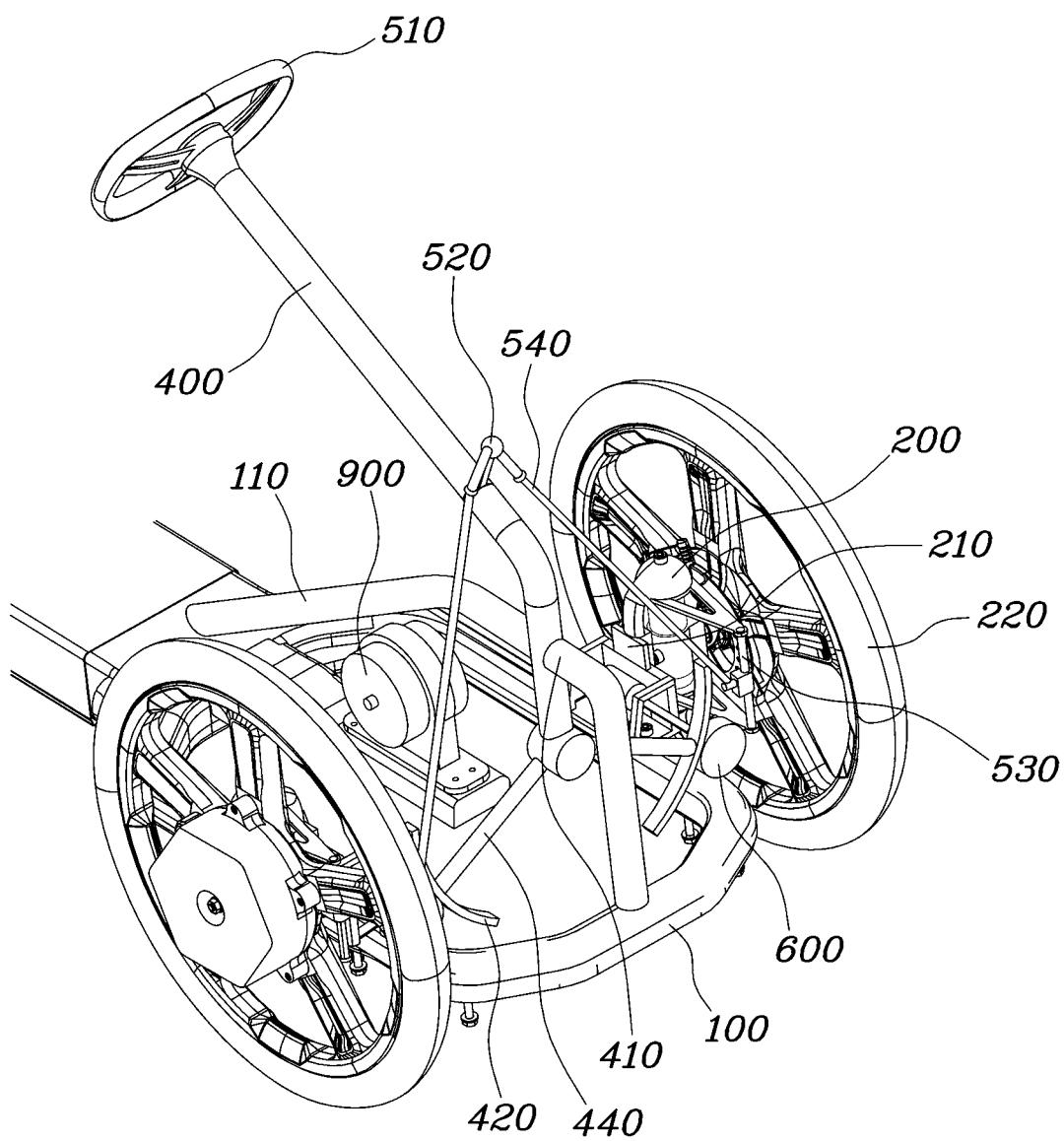
FIG. 2 is a perspective view showing a front portion of the mobility device according to the exemplary embodiment of the present invention.
Figure 3:
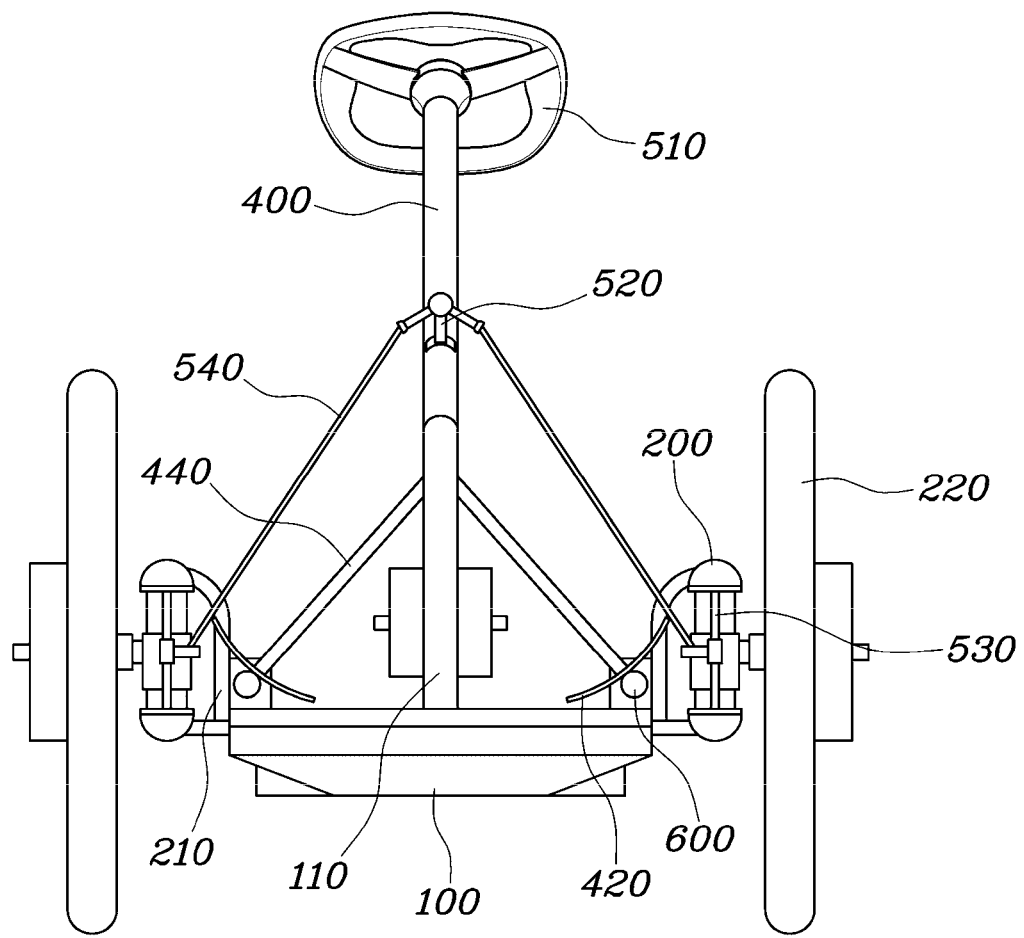
FIG. 3 is a front view showing the mobility device according to the exemplary embodiment of the present invention.

FIG. 1 is a perspective view showing a mobility device 1000 according to an exemplary embodiment of the present invention. FIG. 2 is a perspective view showing a front portion of the mobility device 1000 according to the exemplary embodiment of the present invention. FIG. 3 is a front view showing the mobility device 1000 according to the exemplary embodiment of the present invention.

Referring to FIG. 1, FIG. 2, and FIG. 3, according to the exemplary embodiment of the present invention, a tilting structure of the mobility device 1000 includes: a base frame 100; front wheel frames 200 mounted on opposite front sides of the base frame 100, and coupled to the base frame 100 through front wheel shift gear portions 210 extending in vertical directions; a tilting bar 400 coupled to the base frame 100 to be tiltable to opposite sides with respect to a tilting center 410 fixed to an upper portion of the base frame 100, with a first side of the tilting bar 400 being branched and extending to the opposite sides; and front wheel rotation gears 600 which are connected to opposite end portions 440 branched from the first side of the tilting bar 400, respectively, so to be tiltable in the same direction as the tilting bar 400 when the tilting bar is tilted transversely, and engaged with the front wheel shift gear portions 210 and tilted and thus move the front wheel shift gear portions 210 relative to each other in the vertical directions with respect to the base frame 100.

The base frame 100 is formed in a shape of a plate extending in a direction parallel to the ground, and may have a passenger space on an upper portion thereof.

According to an exemplary embodiment of the present invention, the mobility device 1000 may further include a driving portion 900 to drive a front wheel 220 or a rear wheel 320 by a driving force generated from a driving source or a driving force provided by the passenger. The driving portion 900 may be a motor generating a driving force by use of a power source such as electricity, may be provided with a driving force by pedaling of the passenger, as in the case of riding a bicycle, or may be a hybrid driving system including both driving by both the passenger and the motor.

The mobility device 1000 in an exemplary embodiment of the present invention may be a mobility device 1000 driven by four wheels including two front wheels 220 and two rear wheels 320. Driving wheels may be the front wheels 220, the rear wheels 320, or All Wheel Drive (AWD).

The front wheel frames 200 may be mounted on opposite front sides of the base frame 100. The front wheels 220 may be rotatably coupled to the front wheel frames 200, respectively. Axles of the front wheels 220 may be coupled to side surfaces of the front wheel frames 200.

The front wheel frames 200 include the front wheel shift gear portions 210 extending in the vertical directions, respectively. The front wheel frames 200 are coupled to the base frame 100 through the front wheel shift gear portions 210 and thus may perform relative movement in vertical directions. The front wheel frames 200 may further include suspensions such as a spring and a damper, and may be coupled to the front wheels 220 through the suspensions.

Each of the front wheel shift gear portions 210 may have teeth along the vertical direction to be engaged with each of the front wheel rotation gears 600.

The tilting bar 400 may be coupled to the base frame 100 to be tiltable to opposite sides with respect to the tilting center 410 fixed to the base frame 100. The tilting bar 400 may be branched from a lower portion of the tilting center 410 to the opposite sides and branched end portions may extend to the front wheel frames 200, respectively.

The front wheel rotation gears 600 may be respectively engaged with the opposite front wheel shift gear portions 210, and may be connected to the opposite end portions 440 branched from the first side of the tilting bar 400. Accordingly, as the tilting bar 400 is transversely tilted, the opposite front wheel rotation gears 600 may be rotated in the same direction as the tilting bar 400. Accordingly, the front wheel rotation gears 600 are rotated in the same direction thereof, and may move the opposite front wheel shift gear portions 210 relative to each other with respect to the base frame 100.

Accordingly, as the tilting bar 400 is transversely tilted with respect to the tilting center 410, the opposite front wheel shift gear portions 210 are moved in directions opposite to each other by the same distance, whereas tilting of the front wheels may be realized.

Figure 4:
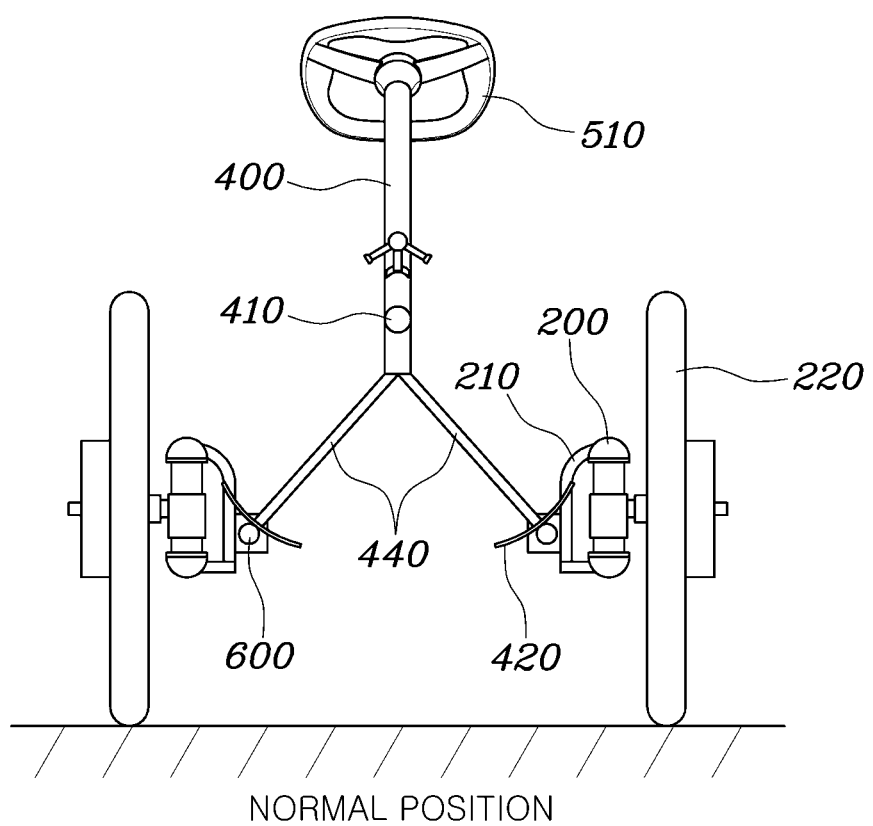
FIG. 4, FIG. 5 and FIG. 6 are views schematically showing a tilting process of the mobility device according to the exemplary embodiment of the present invention.
Figure 5:
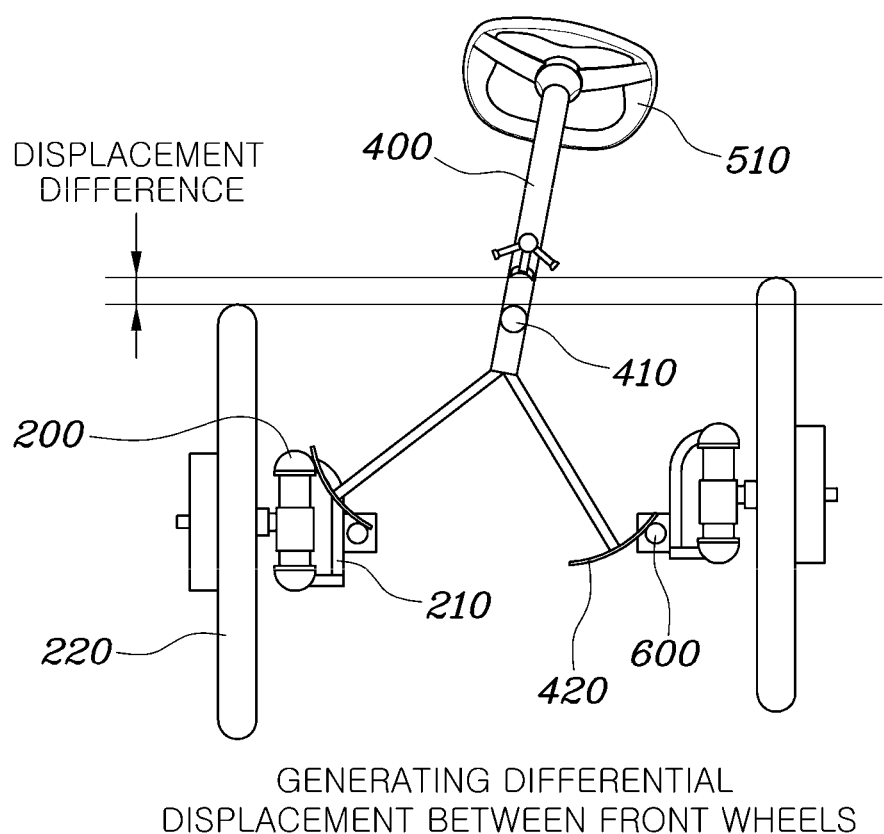
Figure 6:
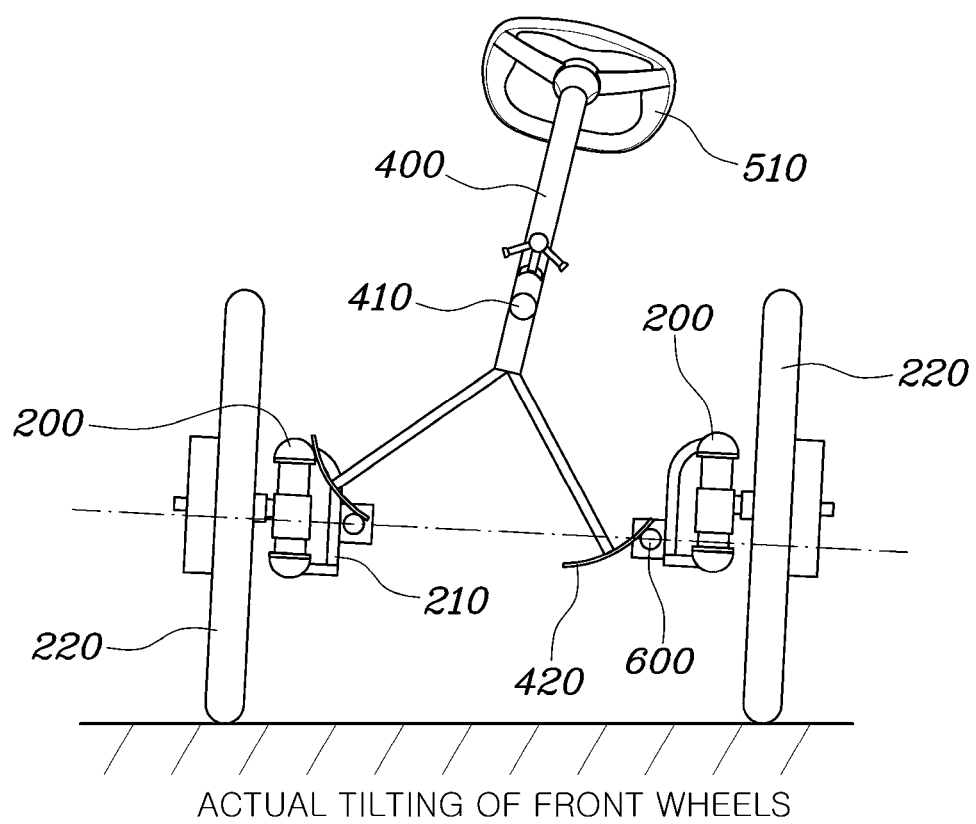

FIG. 4, FIG. 5 and FIG. 6 are views schematically showing a tilting process of the mobility device 1000 according to the exemplary embodiment of the present invention.

Referring to FIG. 4, FIG. 5 and FIG. 6, when the tilting bar 400 of the mobility device 1000 is transversely tilted with respect to the tilting center 410, the differential displacement is generated between the opposite front wheels 220 as shown in FIG. 5.

Assuming that the base frame 100 is kept parallel to the ground, the tilting bar 400 rotates the left and right front wheel rotation gears 600 counterclockwise while being tilted clockwise. Thus, a left front wheel shift gear portion 210 is moved downwards and a right front wheel shift gear portion 210 is moved upwards.

However, actually, the opposite front wheels 220 are all in contact with the ground by load applied to the base frame 100, as shown in FIG. 6. Accordingly, there is an effect that the opposite front wheels 220 and the base frame 100 are tilted by the differential displacement between the opposite front wheels 220.

Referring to FIG. 1, FIG. 2, and FIG. 3 again, the base frame 100 may be provided with a connection link 110, the connection link 110 extending upward and having a shape extending in a longitudinal direction of the base frame to form the tilting center 410 at which the tilting bar 400 is tilted. The tilting bar 400 may be coupled to the connection link 110 to be tiltable to the opposite sides.

The connection link 110 may be fixed to the base frame 100, and have the shape extending upwards from the base frame 100 and extending in the longitudinal direction at a position of the tilting center 410. The tilting bar 400 may be coupled to the connection link 110 at the position of the tilting center 410 to be tiltable to the opposite sides.

Therefore, as the tilting bar 400 is transversely tilted from an upper portion of the tilting center 410, rotation of the front wheel rotation gears 600 and movement of the front wheel shift gear portions 210 depending on the rotation may be realized from the lower portion of the tilting center 410.

The front wheel rotation gears 600 extend in a longitudinal direction of the base frame, and may be coupled to the base frame 100 to be rotatable on axes of the extending directions thereof. That is, positions of the front wheel rotation gears 600 are fixed to the base frame 100, and the front wheel rotation gears 600 may be coupled to the base frame 100 to be rotatable on the axles extending in the longitudinal directions, and may move the front wheel shift gear portions 210 relative to each other with respect to the base frame 100.

The opposite end portions 440 branched from the first side of the tilting bar 400 are provided with tilting gears 420 engaged with the front wheel rotation gears 600. As the tilting bar 400 is tilted, the front wheel rotation gears 600 may be rotated by movements of the tilting gears 420.

The tilting gears 420 are positioned at the branched end portions of the tilting bar 400, and may be turned sideward of the tilting bar 400 by the tilting of the tilting bar 400. On the opposite end portions 440 branched from the first side of the tilting bar 400, the tilting gears 420 engaged with the front wheel rotation gears 600 are provided, so that the front wheel rotation gears 600 may be rotated by the movements of the tilting gears 420 as the tilting bar 400 is tilted.

Accordingly, the tilting gears 420 may transmit tilting movement of the tilting bar 400 as rotational movements of the front wheel rotation gears 600.

The tilting gears 420 may extend from the opposite end portions 440 branched from the first side of the tilting bar 400 in a circumferential direction of the tilting bar 400 which is tilted with respect to the tilting center 410.

That is, the tilting gears 420 may extend along moving paths of the opposite end portions 440 due to the tilting of the tilting bar 400, and each have gear teeth along the extending direction thereof, the gear teeth being engaged with each of the front wheel rotation gears 600. Accordingly, even when the tilting bar 400 is tilted, there is an effect that the tilting gears 420 may maintain engagement with the front wheel rotation gears 600.

A second side of the tilting bar 400 may extend upward and be bent backward. The tilting bar 400 may extend upward and be inclined backward from the upper portion of the tilting center 410.

Accordingly, a driver can easily tilt the tilting bar 400 transversely while being accommodated in the passenger space.

Figure 7:
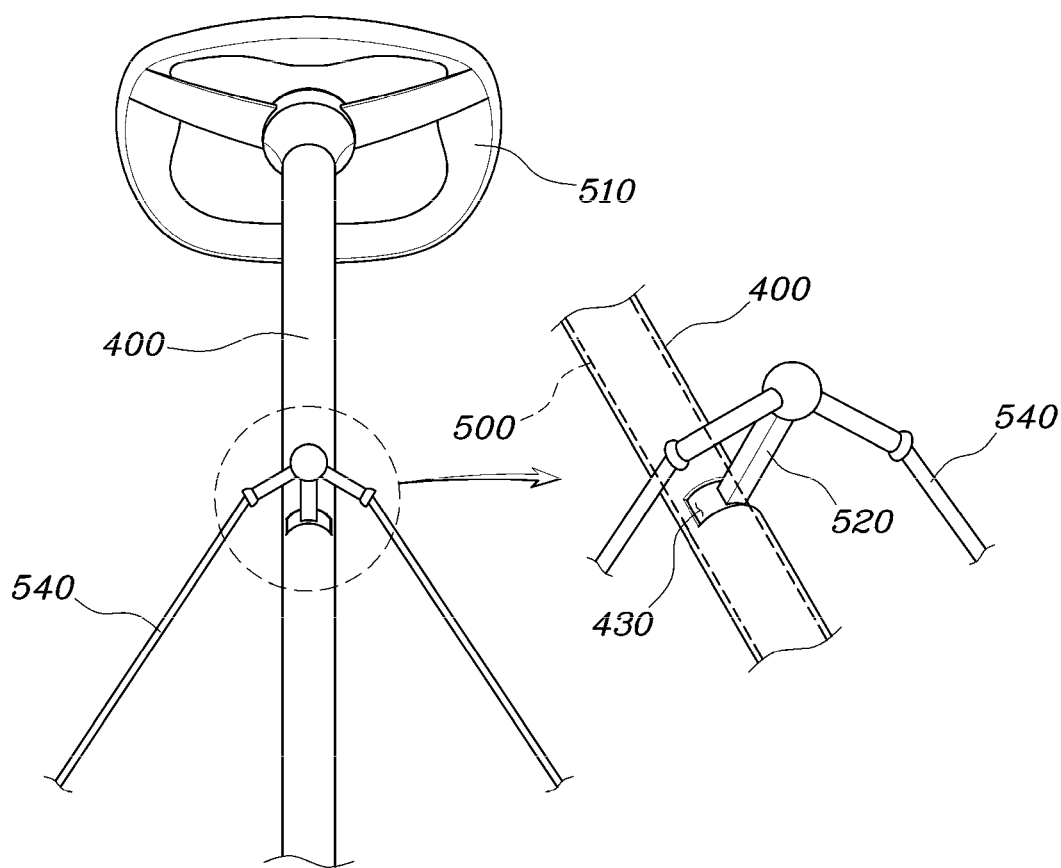
FIG. 7 is a view showing a coupling state of a tilting bar and a steering bar of the mobility device according to the exemplary embodiment of the present invention.
Figure 8:
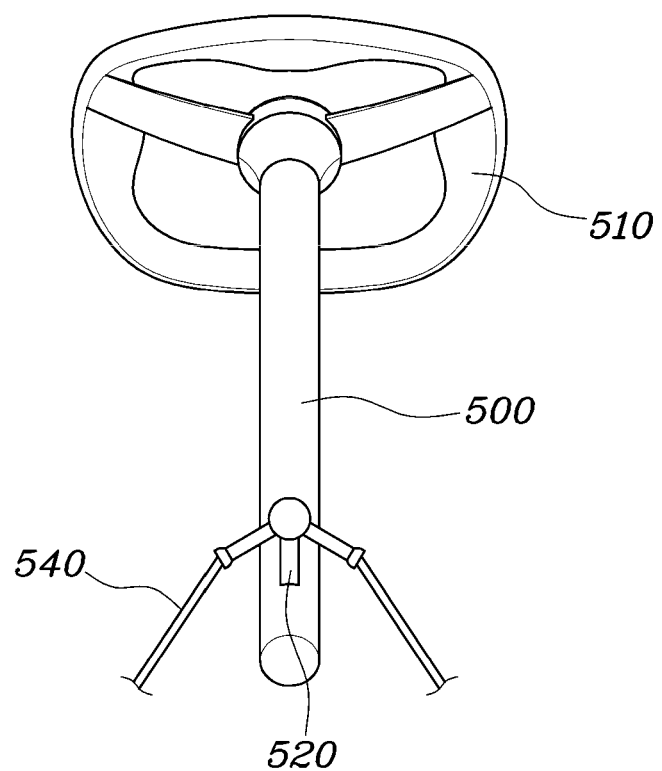
FIG. 8 is a view showing a connection state of the steering bar according to the exemplary embodiment of the present invention.

FIG. 7 is a view showing a coupling state of the tilting bar 400 and a steering bar 500 of the mobility device 1000 according to the exemplary embodiment of the present invention. FIG. 8 is a view showing a connection state of the steering bar 500 according to the exemplary embodiment of the present invention.

Referring to FIGS. 7 to 8, the tilting structure of the present invention further includes the steering bar 500. The steering bar 500 extends from the upper portion of the tilting center 410 in a direction parallel to the tilting bar 400, and is connected to the front wheels 220 to steer the front wheels 220 transversely as the steering bar 500 is controlled on an axis of an extending direction thereof. Here, the steering bar 500 may be coupled to the tilting bar 400 to be controlled relative to the tilting bar 400 on the axis of the extending direction thereof.

As the exemplary embodiment of the present invention, the tilting bar 400 may be configured as a hollow shaft having a space therein, and the steering bar 500 may be coupled to the tilting bar 400 to be controlled relative to the tilting bar 400 by being inserted therein.

The tilting bar 400 may be coupled to the steering bar 500 to be tilted relative thereto, and the steering bar 500 may be moved while being inserted into the tilting bar 400.

Furthermore, a steering handle 510 may be provided on an upper end portion of the steering bar 500, the steering handle 510 extending in a planar direction perpendicular to the longitudinal direction of the steering bar 500.

The steering bar 500 extends to the outside rather than a second side end portion of the tilting bar 400, and the steering handle 510 may be coupled to an end portion of the steering bar 500 extending to the outside rather than the second side end portion of the tilting bar 400.

Accordingly, the driver controls the steering handle 510 integrally turned with the steering bar 500 on an axis of the longitudinal direction of the steering bar 500 to steer the mobility device 1000. Furthermore, as the driver controls the steering handle 510 transversely, the tilting bar 400 is tilted transversely on the basis of the tilting center 410, so that the tilting of the front wheels 220 may be realized.

The steering bar 500 is provided with a coupling pin 520, the coupling pin 520 protruding from an external surface of the steering bar 500 and extending to the outside while passing through the tilting bar 400. The tilting bar 400 is provided with a through hole 430 through which the coupling pin 520 passes, and the through hole 430 may extend along a moving path of the coupling pin 520 depending on relative movement of the steering bar 500.

The coupling pin 520 protruding on the external surface of the steering bar 500 may extend in a direction perpendicular to the longitudinal direction of the steering bar 500. The coupling pin 520 may be integrally turned with the steering bar 500 along a steering direction of the steering bar 500.

The coupling pin 520 passes through the through hole 430 provided on the tilting bar 400, and the through hole 430 may extend the moving path of the coupling pin 520 depending on the relative rotation of the steering bar 500.

The tilting structure of the present invention may include: steering shafts 530 extending in vertical directions, spaced in a longitudinal direction of the base frame apart from the front wheel frames 200 to which the axles of the front wheels are coupled, and turning the front wheel frames 200 transversely while being moved transversely; and steering connection links 540 extending from the coupling pin 520 to opposite sides and coupled to the steering shafts 530, respectively, and being moved transversely by the control of the steering bar 500.

The steering shafts 530 may extend in the vertical directions, and be rotatably coupled to the front wheel frames 200 to be turned on axes of the vertical directions. The axles and the extending directions of the steering shafts 530 may be parallel to the extending direction of the front wheel frames 200.

The axles of the front wheels 220 may be coupled to the front wheel frames 200, and the steering shafts 530 may be spaced from the front wheel frames 200 in the longitudinal direction thereof.

The steering connection links 540 may connect between the coupling pin 520 and the steering shafts 530. First end portions of the steering connection links 540 may be moveably coupled to an end portion of the coupling pin 520, and second end portions of the steering connection links 540 may be moveably coupled to the steering shafts 530.

The end portion of the coupling pin 520 is moved due to the control of the steering bar 500 and the coupling pin 520, thus the steering connection links 540 are moved transversely. As the steering shafts 530 are moved transversely, the front wheel frames 200 are turned transversely, so that the tilting of the front wheels 220 may be realized.

Figure 9:
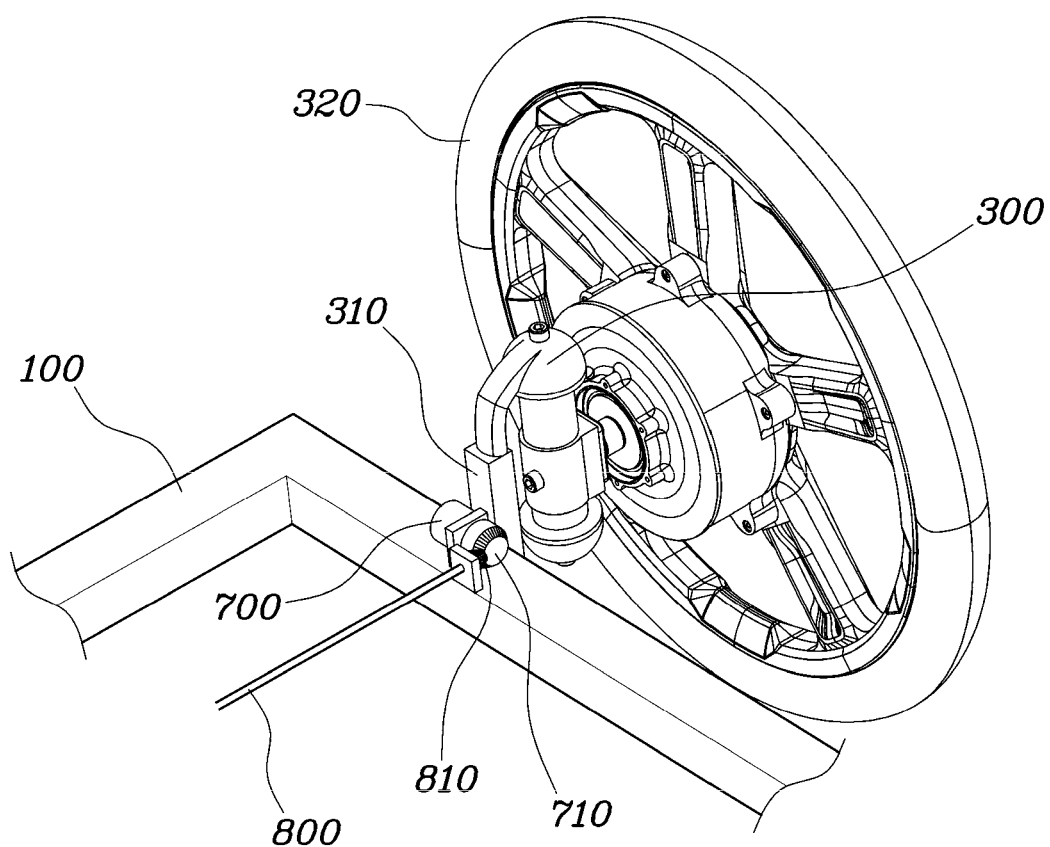
FIG. 9 is a perspective view showing a rear portion of the mobility device according to the exemplary embodiment of the present invention.
Figure 10:
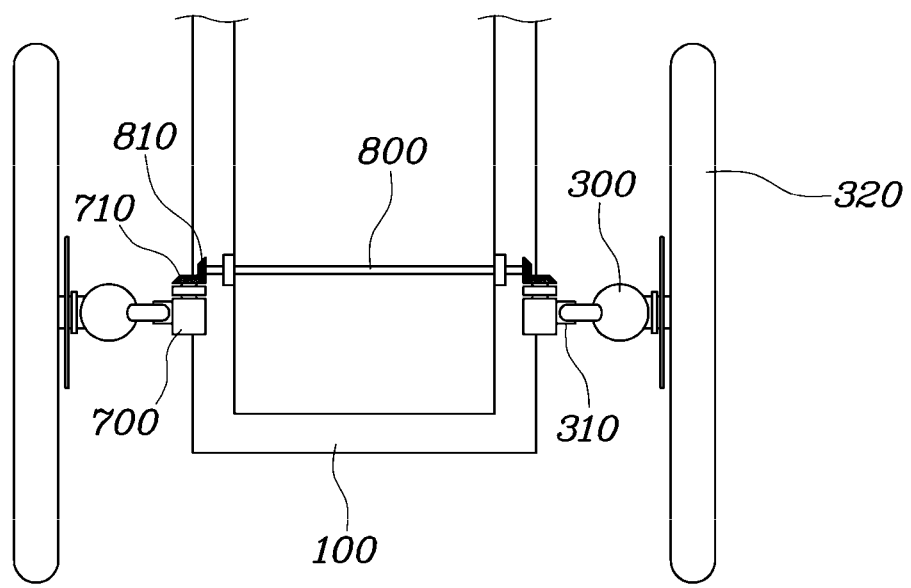
FIG. 10 is a top view showing the rear portion of the mobility device according to the exemplary embodiment of the present invention.

FIG. 9 is a perspective view showing a rear portion of the mobility device 1000 according to the exemplary embodiment of the present invention. FIG. 10 is a top view showing the rear portion of the mobility device 1000 according to the exemplary embodiment of the present invention.

Referring to FIGS. 9 to 10, the tilting structure of the present invention may include: rear wheel frames 300 mounted on opposite rear sides of the base frame 100, and coupled to the base frame 100 through rear wheel shift gear portions 310 extending in vertical directions; and rear wheel rotation gears 700 engaged with the rear wheel shift gear portions 310 and rotated, and thus moving the rear wheel shift gear portions 310 relative to each other in the vertical directions with respect to the base frame 100.

Axles of the rear wheels 320 may be rotatably coupled to sides of the rear wheel frames 300, respectively. The rear wheels 320 are not directly steered by the driver, but may be passively steered on the basis of the steering of the front wheels 220.

Also, tilting of the rear wheels 320 is not directly controlled by the driver, but the rear wheels 320 may be passively tilted in conjunction with tilting of the base frame 100 when the front wheels 220 are tilted.

The rear wheel frames 300 may have the rear wheel shift gear portions 310 extending in the vertical directions. The rear wheel shift gear portions 310 may each have gear teeth along the vertical directions to be engaged with the rear wheel rotation gears 700.

Movements of the rear wheel rotation gears 700 are fixed on the base frame 100, and the rear wheel rotation gears 700 may be rotatably coupled to the base frame 100 on axes of a longitudinal direction of the base frame.

Accordingly, the rear wheels 320 has a structure configured for tilting with the base frame 100, so that the base frame 100 may be prevented from being distorted due to the tilting of the front wheels 220.

Furthermore, the rear wheel rotation gears 700 respectively provided on the opposite rear wheel frames 300 may be connected to each other to be rotated in conjunction with each other.

That is, the opposite rear wheel frames 300 may be moved relative to each other in opposite directions by the same distance with respect to the base frame 100. For example, when a left rear wheel 320 is moved downwards from the base frame 100, a right rear wheel 320 may be moved upwards from the base frame 100.

Accordingly, as the base frame 100 is tilted, the left and right rear wheels 320 are moved in conjunction with each other and are tilted at the same angle.

The rear wheel rotation gears 700 extend in the a longitudinal direction of the base frame, are rotatably coupled to the base frame 100 on axes in the extending directions thereof, and have the first bevel gears 710 at front end portions or rear end portions thereof, respectively. The tilting structure of the present invention may further include: second bevel gears 810 having axles perpendicularly engaged with axles of the first bevel gears 710; and a bevel gear shaft 800 connecting the opposite second bevel gears 810 to each other so that the opposite second bevel gears 810 are rotated in conjunction with each other.

The rear wheel rotation gears 700 extending in the longitudinal directions are engaged with the rear wheel shift gear portions 310. The rear wheel shift gear portions 310 may be provided with the first bevel gears 710 at the front end portions or the rear end portions thereof. The first bevel gears 710 may be engaged with the second bevel gears 810 rotated on the axles extending sideways. The first bevel gears 710 and the second bevel gears 810 may have the axles perpendicular to each other.

The second bevel gears 810 respectively provided on the left rear wheel 320 and the right rear wheel 320 may be connected to each other by the bevel gear shaft 800 and may be rotated in conjunction with each other.

Due to rotation of the bevel gear shaft 800, the left first bevel gear 710 and the right first bevel gear 710 are engaged with the second bevel gears 810, respectively, and may be rotated in the same direction thereof.

According to the exemplary embodiment of the present invention, the mobility device including the tilting structure of the mobility device may further include the driving portion 900, the driving portion 900 driving the front wheels or the rear wheels by the driving force generated by the driving source or the driving force provided by the passenger.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A tilting structure of a mobility device, the tilting structure comprising:
    a base frame;
    front wheel frames mounted on opposite front sides of the base frame and coupled to the base frame through front wheel shift gear portions extending in a first predetermined direction;
    a tilting bar coupled to the base frame to be tiltable to a first opposite side and a second opposite side of the base frame with respect to a tilting center positioned at a portion of the tilting bar, a first side of the tilting bar being branched and extending to the first and second opposite sides; and
    front wheel rotation gears engaged to first and second opposite end portions branched from the first side of the tilting bar, respectively, to be rotated in a same direction that the tilting bar is tilted with respect to the tilting center, wherein the front wheel rotation gears are engaged with the front wheel shift gear portions and rotated to move the front wheel shift gear portions relative to each other in the first predetermined direction with respect to the base frame.

2. The tilting structure of claim 1,
wherein a connection link extending upward from the base frame is fixed to the base frame, and is formed to extend in a longitudinal direction of the base frame to form the tilting center around which the tilting bar is tilted, and the tilting bar is coupled to the connection link to be tiltable to the first opposite side and the second opposite side with respect to the tilting center.

3. The tilting structure of claim 1,
wherein each of the front wheel rotation gears is aligned in a longitudinal direction of the base frame, and is coupled to the base frame to be rotatable on axes of the front wheel rotation gears.

4. The tilting structure of claim 1,
wherein the first and second opposite end portions branched from the first side of the tilting bar are provided with tilting gears engaged with the front wheel rotation gears, respectively, and the front wheel rotation gears are rotated by movement of the tilting gears while the tilting bar is tilted.

5. The tilting structure of claim 4,
wherein the tilting gears are mounted on the first and second opposite end portions branched from the first side of the tilting bar and extend in a circumferential direction of the tilting bar tilted with respect to the tilting center.

6. The tilting structure of claim 1,
wherein a second side of the tilting bar extends upward and is bent backward of the tilting bar.

7. The tilting structure of claim 1, further including:
a steering bar extending from an upper portion of the tilting center in a longitudinal axis of the tilting bar, the steering bar being connected to front wheels to rotate the front wheels sideways while the steering bar is rotated on an axis of the steering bar,
wherein the steering bar is coupled to the tilting bar to be rotatable relative to the tilting bar on the axis of the steering bar.

8. The tilting structure of claim 7,
wherein the tilting bar is formed as a hollow shaft having a space therein and the steering bar is inserted in the tilting bar to be rotatable relative to the tilting bar.

9. The tilting structure of claim 8,
wherein the tilting bar has a through hole,
wherein the steering bar has a coupling pin protruding from an external surface of the steering bar through the through hole of the tilting bar and extending to an outside of the tilting bar by passing through the through hole of the tilting bar, and
wherein the through hole is formed to extend along a moving path of the coupling pin, the moving path being a path for the steering bar to rotate relative to the tilting bar.

10. The tilting structure of claim 9, further including:
steering shafts extending in the first predetermined direction, spaced in a longitudinal direction of the base frame apart from the front wheel frames to which axles of the front wheels are coupled, and turning the front wheel frames transversely while the steering shafts are moved transversely; and
steering connection links extending from the coupling pin to the first and second opposite sides and coupled to the steering shafts respectively, and being moved transversely by a rotation of the steering bar.

11. The tilting structure of claim 7,
wherein a steering handle is provided on an upper end portion of the steering bar to extend in a planar direction perpendicular to the axis of the steering bar.

12. The tilting structure of claim 1, further including:
rear wheel frames mounted on opposite rear sides of the base frame, and coupled to the base frame through rear wheel shift gear portions extending in the first predetermined direction; and
rear wheel rotation gears engaged with the rear wheel shift gear portions and rotated to move the rear wheel shift gear portions relative to each other in the first predetermined direction with respect to the base frame.

13. The tilting structure of claim 12,
wherein the rear wheel rotation gears respectively provided on the rear wheel frames are connected to each other to be rotated in conjunction with each other.

14. The tilting structure of claim 13,
wherein the rear wheel rotation gears extend in a longitudinal direction of the base frame, are coupled to the base frame to be rotatable on axes of the rear wheel rotation gears, and have first bevel gears, respectively, at front end portions or rear end portions thereof,
wherein the tilting structure further includes:
second bevel gears having axles perpendicularly engaged with axles of the first bevel gears; and
a bevel gear shaft connecting the second bevel gears to each other so that the second bevel gears are rotated in conjunction with each other.

15. A mobility device including the tilting structure of claim 1, the mobility device further comprising:
a driving portion driving front wheels or rear wheels by a driving force provided by a driving source or a passenger.

* * * * *